Aug. 19, 1930. A. REID 1,773,240
INTERNAL COMBUSTION AND OTHER FLUID PRESSURE ENGINE INDICATOR
Filed Feb. 5, 1927 3 Sheets-Sheet 3

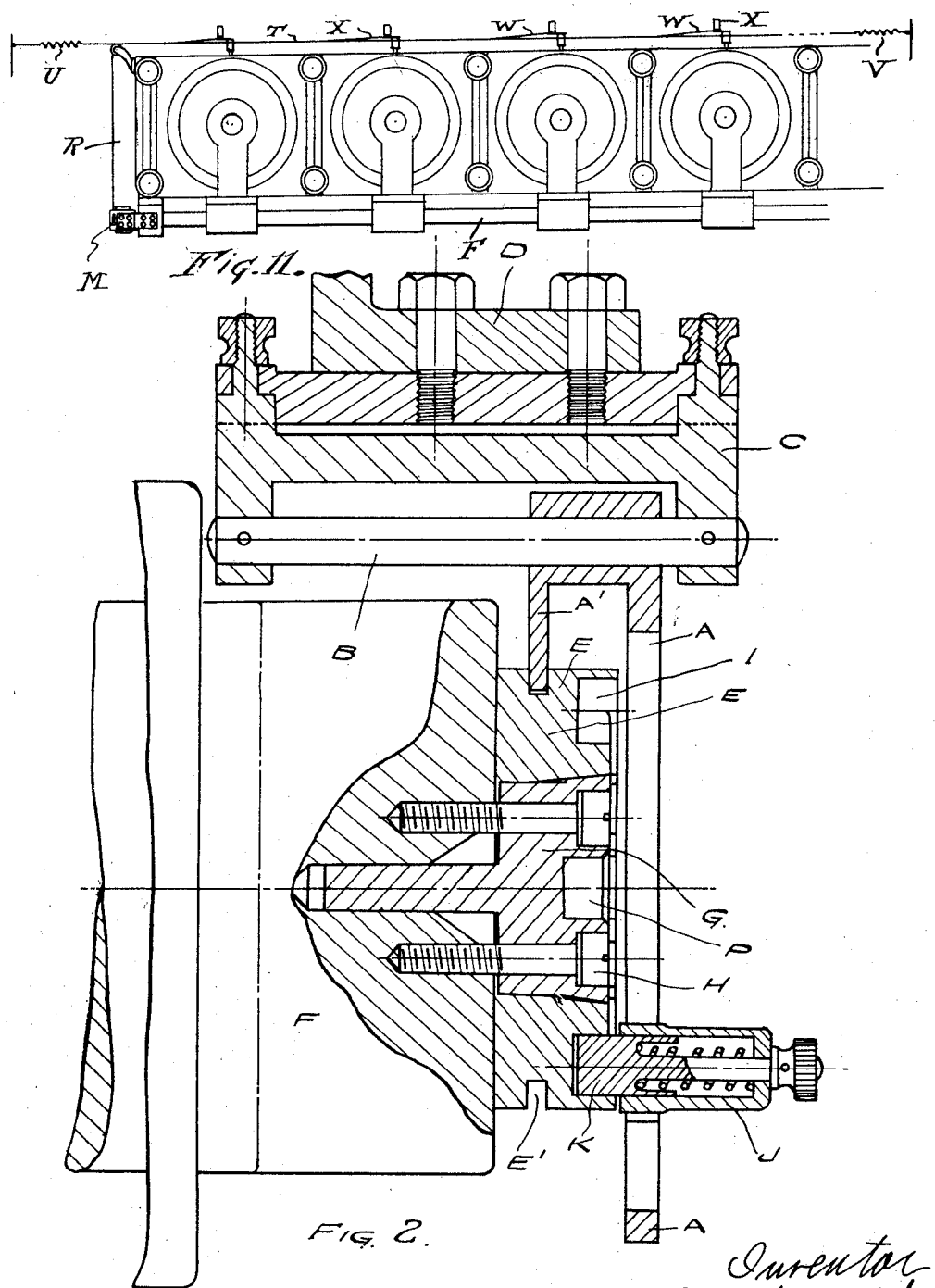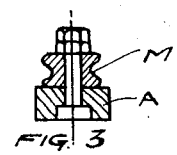

Patented Aug. 19, 1930

1,773,240

UNITED STATES PATENT OFFICE

ALEXANDER REID, OF ABERDEEN, SCOTLAND, ASSIGNOR TO DOBBIE-McINNES AND CLYDE LIMITED, OF GLASGOW, SCOTLAND

INTERNAL-COMBUSTION AND OTHER FLUID-PRESSURE ENGINE INDICATOR

Application filed February 5, 1927. Serial No. 166,266, and in Great Britain February 6, 1926.

My invention relates to improvements in and connected with internal combustion and other fluid-pressure engine indicating gear, and resides in the provision of means of obtaining from internal combustion engines of the Diesel or other systems, indicator diagrams of the "draw" type, that is to say, continuous forward (not reciprocating) diagrams, as apart from pressure volume diagrams, and has for its object to obtain these "draw" diagrams automatically, and also to ensure the top dead centre line being exactly in the centre of the diagram, such "draw" diagram being a distorted diagram showing an enlargement of the incidents taking place at the top dead centre of the pressure volume diagram and from the "draw" diagram, these incidents being on a much enlarged scale, the points at which they issue can with the aid of scales referred to later, be located exactly in degrees or piston movements and thereby enable any necessary engine adjustments to be more accurately made.

In carrying out this invention, I provide a rocking or moving lever mounted on a suitable frame fixed to the framework of the engine and driven by an adjustable outer disc clamped to the end of the cam-shaft by means of an inner disc; the fulcrum of the lever being also adjustable. The outer disc referred to has recesses in its face to correspond to the number and position of cylinders in the engine. A spring-loaded crank pin connects the lever to a given hole or recess in this disc applicable to its particular cylinder. When it is desired to change over to another cylinder the spring-loaded crank-pin is released by hand and placed in the hole or recess on the outer disc corresponding to the cylinder of which indications are required.

The lever is further designed so that any wear can be counteracted by adjusting its fulcrum pin.

A special lever sliding on a fulcrum pin is supplied for a reversible engine, thus making it possible to obtain a reversing diagram and also to indicate pressures and other factors when the engine is running astern.

In order that my invention may be properly understood and readily carried into effect, I have hereunto appended three sheets of drawings, of which Figure 1 is a front view of the apparatus illustrating my inventon.

Figure 2 is an elevation in section of Figure 1.

Figure 3 is a sectional view of the cord attachment.

Figure 11 is a diagrammatic plan of part of a Diesel engine provided with my improved indicating gear.

Figure 1:
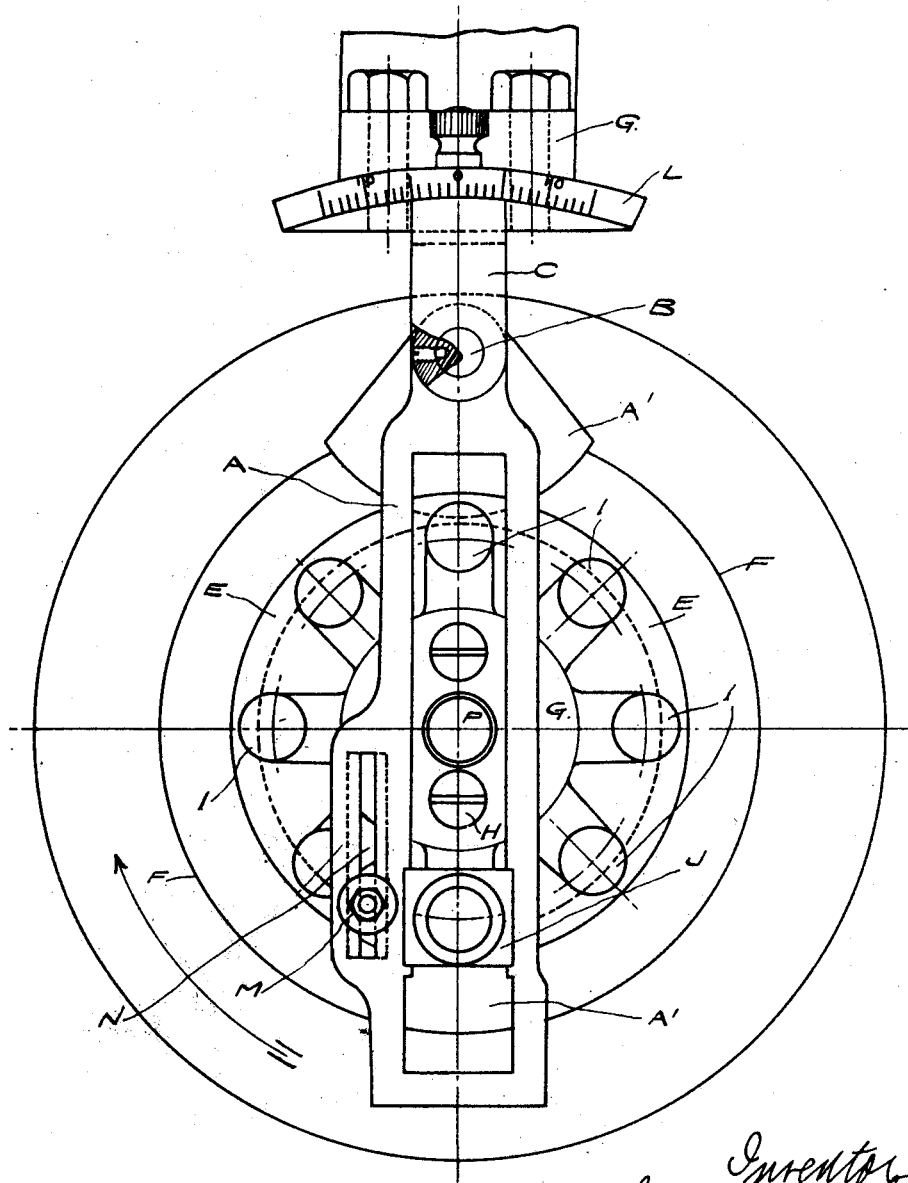

Referring to the drawings, A is the rocking or moving lever which is suitably pivoted to a pin carried in a bracket C, which bracket C is suitably fixed to the framework D of the engine. The rocking lever A is slotted internally to carry a slider J which contains a spring-loaded crank-pin K, the said spring-loaded crank-pin being of such a size as to fit into the recesses I in the outer disc E. When the apparatus is not in use the crank-pin K is positioned in a recess P on the clamping disc G or is taken out through the widened slot, this recess P being in the centre of the clamping disc G and the slot A' being at the lower part of the lever A. The rocking lever A is driven by the adjustable outer disc E which is clamped to the end of the engine cam-shaft F, the said outer disc E being retained in position by the inner or clamping disc G which is screwed to the end of the engine cam-shaft F by studs or screws H which may be loosened back in order to adjust the rotary position of the outer disc E when being fitted to the engine. The recesses or notches I cut in the surface of the outer disc E correspond in number to the engine cylinders and in position to the top dead centre of each cylinder when firing takes place. The pivot pin B is capable of being adjusted about the axis of the cam-shaft F by means of a quadrant L which is suitably carried in the bracket D. Such adjustment is necessary in cases where there is a slight discrepancy between the actual angles between the cranks of the engine and the correct angle; also wear of the moving parts of the gear after a long period of usage may be taken up in the same way.

A small pulley M is also suitably attached to an internal slot N forming part of the rocking lever A, the slot N being provided for adjusting the position of the pulley M so as to give various lengths of diagrams suitable for different sizes and types of indicators. The ends of the indicator cords are attached to the pulley M and, by the rocking motion imparted to the lever A when the cam-shaft F is in motion, operates the engine indicator. From the pulley M a lead R is taken round a pulley S, fitted to a convenient stationary part of the engine, to connect with the main lead T which is suspended and held taut by two light tension springs U and V. At intervals along the main lead T, means are provided for attaching the indicator cords V V of the indicators (or recording means D). In place of the pulley M, as described, I may employ any other suitable form of attachment.

In order to take diagrams when the engine is reversed and to indicate pressures, the rocking lever A is provided with an extended sector A', which engages with the recess E' on the periphery of the adjustable outer disc E, the rocking lever A being capable of sliding along the pivot pin B.

Figure 4:
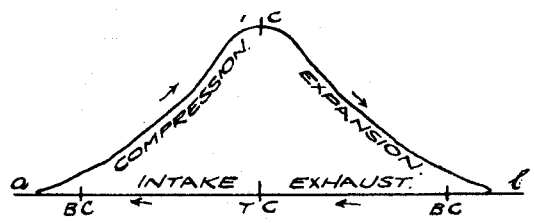
Figures 4, 5 and 6 are specimen diagrams taken by the apparatus of four cycle engines.
Figure 5:
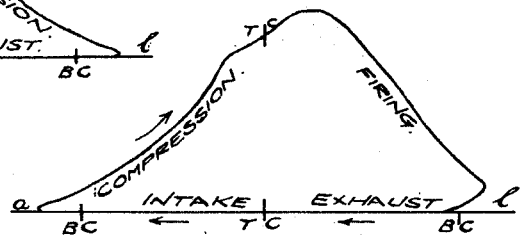
Figure 6:
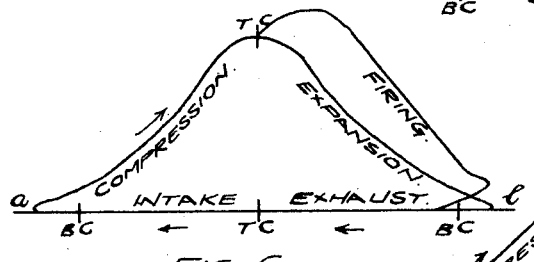
Figure 7:
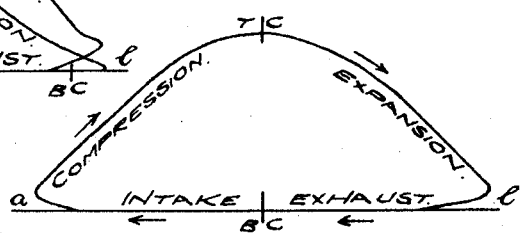
Figures 7, 8 and 9 are specimen diagrams taken by the apparatus of two cycle engine.
Figure 8:
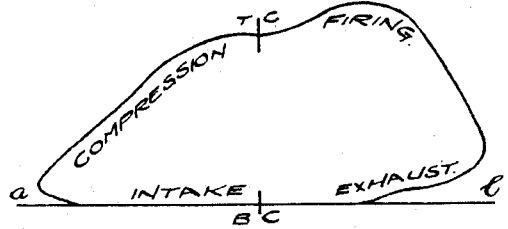
Figure 9:
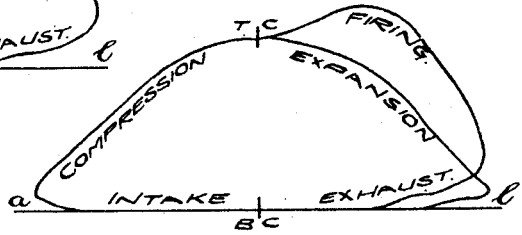

Referring to Figures 4, 5 and 6, Figure 4 illustrates a compression diagram of a four cycle engine, Figure 5 illustrates a power diagram and Figure 6 a combined compression and power diagram, all showing the four lines of the cycle separately with the addition of a magnified view of incidents taking place over the dead centre. Referring to Figures 7, 8 and 9, these are similar to Figures 4, 5 and 6 but as applied to a two cycle engine.

Figure 10:
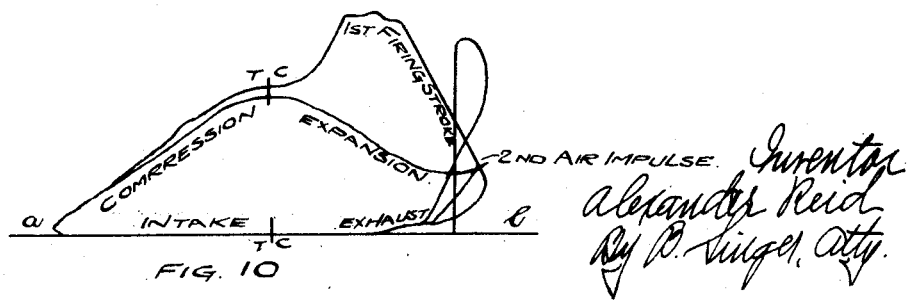
Figure 10 is a specimen diagram taken when starting off a four cycle engine.

Referring to Figure 10, this shows a diagram starting from air supplied under pressure, showing the air impulses and firing stroke.

It is here explained that diagrams vary according to the running condition of the engines.

*Action of the rocking lever.*—The arrangement of the rocking lever A in relation to the outer disc E is such that a quick action takes place during compression and combustion, thus drawing out the head of the diagram, and a slow action occurs on the return motion or during the exhaust and intake strokes. This relationship provides that at about 120 degrees before top dead centre on a four cycle and about 60 degrees on a two cycle engine, i. e. the compression stroke, the lever, to which, of course, the indicator cord is attached, begins to acquire a rapid movement being at its fastest over the dead centre and afterwards slows down correspondingly until about 120 (or 60) degrees on the other side of the dead centre, i. e. the expansion stroke. This action from these angles on both sides of the dead centre represents one entire forward stroke of the indicator, thus diagrammatically enlarging the representation of the incidents taking place in the cylinder on the compression and firing strokes to a most appreciable extent, which incidents on an ordinary pressure volume diagram are represented by an infinitesimal part of the entire card and yet represents the most important part of that card. The return action of the lever gives the exhaust and intake lines separately so that these can be better compared with the atmospheric line.

I also provide transparent scales of degrees and equal piston movement, the scale of degrees being used for adjustments and the scale of equal piston movement for calculating the T. H. P. engine.

I claim—

1. In combination with a fluid pressure actuated motor revoluble element, a member on the end thereof having a recess arranged axially of said shaft and also an annular series of recesses concentric with the first named recess, a rocking lever having a longitudinal slot, a pin movable in said slot and engageable at will with any of the said recesses and an indicator cord actuating member mounted on said rocking lever and shiftable thereon.

2. Indicator mechanism as claimed in claim 1, including a supporting bracket and a pin carried by said bracket, arranged parallel with and adjustable about the axis of said revoluble element and on which pin said rocking lever is mounted.

3. Indicator mechanism as claimed in claim 1, in which the member at the end of said revoluble element is a disc provided with an annular groove in its periphery, said rocking lever is shiftable on said pin longitudinally with respect to said revoluble element and said lever is provided with a quadrant arm which engages in said groove.

In witness whereof I affix my signature.

ALEXANDER REID.